United States Patent [19]

Wagner et al.

[11] Patent Number: 5,232,960

[45] Date of Patent: Aug. 3, 1993

[54] PROCESS AND PLANT FOR MANUFACTURING HEAT-HARDENABLE MELTABLE MIXTURES SUCH AS REACTIVE HOT MELT ADHESIVES

[75] Inventors: Daniel Wagner, Basel; Karl Mechera, Muttenz, both of Switzerland

[73] Assignee: Ciba-Geigy Corporation, Ardsley, N.Y.

[21] Appl. No.: 742,176

[22] Filed: Aug. 1, 1991

Related U.S. Application Data

[63] Continuation of Ser. No. 559,436, Jul. 24, 1990, abandoned, which is a continuation of Ser. No. 244,194, Sep. 14, 1988, abandoned.

[30] Foreign Application Priority Data

Sep. 25, 1987 [CH] Switzerland .......... 3716/87
Oct. 6, 1987 [CH] Switzerland .......... 3899/87

[51] Int. Cl.$^5$ .............................. C08J 3/22
[52] U.S. Cl. .................... 523/348; 523/351; 523/400; 523/435
[58] Field of Search ............ 523/351, 353, 400, 435, 523/348

[56] References Cited

U.S. PATENT DOCUMENTS

| | | | |
|---|---|---|---|
| 3,641,195 | 3/1972 | Ball et al. .......... | 260/837 R |
| 4,001,368 | 1/1977 | Michizoe et al. .......... | 264/236 |
| 4,025,058 | 5/1977 | Mizuguchi .......... | 366/76 |
| 4,357,432 | 11/1982 | Edwards .......... | 523/351 |
| 4,518,631 | 5/1985 | Antonen .......... | 523/435 |
| 4,612,209 | 9/1986 | Fargo et al. .......... | 427/54.1 |
| 4,656,207 | 4/1987 | Jabloner et al. .......... | 523/400 |
| 4,661,539 | 4/1987 | Goel .......... | 523/400 |
| 4,663,103 | 5/1987 | McCullough et al. .......... | 264/40.4 |
| 4,707,518 | 11/1987 | Shah .......... | 525/122 |
| 4,803,232 | 2/1989 | Shah .......... | 523/456 |
| 5,106,469 | 4/1992 | Johnson .......... | 525/533 |

OTHER PUBLICATIONS

Tadmor and Gogos, "Principles of Polymer Processing", Wiley Interscience, New York, 1979, pp. 3–10.
Rodriguez, "Principles of Polymer Systems", Hemisphere Publishing Corp. (McGraw-Hill), New York, 1982, pp. 330–349.
Billmeyer, Jr., "Textbook of Polymer Science", 3rd Ed., Wiley Interscience, New York, 1984, pp. 445–448.

*Primary Examiner*—Joseph L. Schofer
*Assistant Examiner*—R. H. Delmendo
*Attorney, Agent, or Firm*—Harry Falber; JoAnn Villamizar; William A. Teoli, Jr.

[57] ABSTRACT

A process for producing as end-product a heat-hardenable mixture forming thermosetting resin, e.g., a reactive hot-melt adhesive, comprises preparing a first pre-mixture by introducing a meltable heat-hardenable solid resin and liquid resin, flexibilizer, adhesion-promoter and/or plasticizer into a mixing zone in which the components are melted together; preparing a second pre-mixture by mixing with each other a heat-activatable hardener and thixotropic agent, hardening accelerator and/or electrical conductivity-imparting additive; introducing the melt into an extruding zone; and introducing the pulverulent pre-mixture into the extruding zone downstream of the melt-intake for mixing with the first pre-mixture at a temperature below said hardening temperature and in such amount that the content of the second pre-mixture in the end-product ranges from 10 to 50, preferably from 20 to 30 weight-% air occlusions in the melt and the extruded end-product being avoided.

26 Claims, 2 Drawing Sheets

PROCESS AND PLANT FOR MANUFACTURING HEAT-HARDENABLE MELTABLE MIXTURES SUCH AS REACTIVE HOT MELT ADHESIVES

This application is a continuation, of application Ser. No. 559,436, filed Jul. 19, 1990, now abandoned, which is a continuation of Ser. No. 244,194, filed Sep. 14, 1988, now abandoned.

BACKGROUND OF THE INVENTION

This invention relates to a process for manufacturing, as end product, a heat-hardenable meltable mixture capable of forming thermosetting resins; in a further aspect the invention relates to a plant for carrying out the aforesaid novel process, and in a third aspect such plant comprises a novel feeding chamber for introducing a pre-mixture of certain components of the above-mentioned mixture into an extruder being part of the plant.

Preferably, the process according to the invention serves for the manufacture of hot melt mixtures solid at room temperature (20° C.), which are hardenable to form thermosetting resins, and in particular for the manufacture of so-called reactive hot melt adhesives.

Meltable mixtures which also comprise sealing and compression-molded material were hitherto manufactured by firstly preparing, for instance in a melt-flow process, a preliminary mixture or pre-mix of finest-ground solid resin, adding thereto optionally liquid resin filler, colorants, lubricating and separating agents which pre-mix was then discontinuously or continuously processed in a roller assembly or an extruder (see "Ullmanns Encyklopädie der technischen Chemie", 4$^{th}$ edition, vol. 19, page 414).

In known processes of manufacture, the components are also melted down in heated agitator vessels and subsequently processed in tabletting or granulating apparatus to obtain packageable end products. Such processing requires working the viscous melt in kneader-type masticators or extruders with, when the viscosity of the melt is high, correspondingly high power input (Ullmann, ibid, vol. 14, page 237).

Industrial practice demands that there are added to the system constituted by resin and hardening agent various additive components which, depending on specifications demanded by a customer, impart to the heat-hardenable, meltable mixture a number of required properties. Such additive compounds can be hardening catalysts, adhesion-adjusting agents, plasticizers, thixotropy-controlling agents, agents imparting electrical conductivity and fillers.

In the German Offenlegungsschrift 2,533,195 there is described an extruder for continuously extruding heat-hardenable resins which avoids the preparation of pre-mixtures. To this end, heat-hardenable resins are fed together with inert additives such as fillers or plasticizers directly into the extruder.

In the German Offenlegungsschrift 1,954,214 there is disclosed a process for the manufacture of masses in which each of the components is dosed individually, and the work-up of all components takes place in a single extruder. The different components are individually successively introduced into the extruder along the processing pass through the latter.

In the above-named publications there is neither any mention of a combination of heat-hardenable resins with hardening agents, nor a discussion of problems arising from such combination.

In the German Offenlegungsschrift 2,404,658 there is described a process for the continuous compression molding of heat-hardenable resins, in which a heat-hardenable mass is passed through an extruder, and the extruded resin mixture is hardened in a hardening mold under certain conditions. Combinations of resins and hardening agent are prepared in this known process and fed into the extruder. There is no suggestion of a separate introduction of a resin component into the extruder and a subsequent feeding into the latter of a pulverulent hardening agent.

In the heat-hardenable meltable resin-and-hardening agent mixtures according to the invention there is used as a hardening agent a heat-activatable hardener which is inactive at room temperature (about 20° C.).

When preparing the necessary preliminary mixtures or "pre-mixtures" according to a process used by us, it was found to be difficult to obtain the necessary fluidity of all components so that, in practice, planet stirrers, mills, in particular impact disc mills, sieves, drum mixers, three-roller mills and kneading apparatus, and in certain cases granulators had to be installed ahead of the preferably used extruder.

Moreover, the melting of a pre-mixture in which a heat-activatable hardener is present, is only possible if all solid components present therein have melting points below the hardening temperature.

OBJECTS AND SUMMARY OF THE INVENTION

It is therefore an object of the invention to provide a process of the initially-described type involving the preparation of pre-mixtures in which the initially-mentioned final product is a mixture which is capable of forming thermosetting resins and is heat-hardenable and meltable, which process will only require a very small amount of equipment in preparing the required pre-mixtures and in which process the resulting end product is exactly reproducible with all its demanded properties. It is a further object of the invention that, in the aforesaid process, the melting of certain components can be effected independently of the hardening temperature of the system comprising resin and hardening agent.

These objects are attained in accordance with the invention by a process as initially defined which comprises (A) preparing a first pre-mixture (I) by directly introducing into a mixing zone
  (a) a resin component solid at about 20° C. and being hardenable with formation of thermosetting resin by heating to a determined hardening temperature with the aid of a hardening agent being solid and inactive at about 20° C., the solid resin component melting undecomposed and forming a melt being in a temperature range extending from slightly below to above the hardening temperature, and
  (b) at least one additive component being inert relative to the solid resin component (a);
melting the component (a) contained in the pre-mixture (I) and intimately mixing the same with the component (b), the weight proportions of the two components being such that, at the mixing temperature, the viscosity of the mixture is in the range of from about 5,000 to 100,000 mPa.sec;

(B) preparing a second pre-mixture (II) by directly intimately mixing with each other (i) a solid pulverulent hardening agent capable of hardening all resin components present in the first pre-mixture and being inactive at 20° C. and heat-activatable, as well as at least one of the following pulverulent additive components:

(ii) at least one hardening accelerator; and (iii) at least one filler.

(C) introducing the melt, constituting the first pre-mixture, as obtained from the said mixing zone, into an extruding zone while avoiding occlusions of air therein, and then conveying the said melt toward an exit end of the extruding zone; and (D) introducing into the extruding zone, for mixing with said first pre-mixture at a temperature below said hardening temperature the pulverulent second pre-mixture in such proportion that the content of the second pre-mixture in the end product discharged from the exit end of the extruding zone amounts to at least 10 to maximally 50 percent by weight of the total weight of the end product. Preferred final products have a content of about 20 to 35 weight percent of their total weight, of the said second pre-mixture.

In a preferred mode of carrying out the process according to the invention, there is prepared a heat-hardenable, meltable mixture which is preferably solid at room temperature and capable of forming a thermosetting resin, in particular a reactive hot melt adhesive, by the steps of (A) preparing a first pre-mixture (I) by directly introducing into a mixing zone (a') the resin component solid at about 20° C., which has been defined under (a) occurring hereinbefore, and (b') at least one of the following additive components defined under (b), supra, of which at least one is liquid at room temperature (about 20° C.) and any additional additive component which is solid is meltable in the temperature range defined under (a) occurring hereinbefore, while components being liquid at room temperature must be added only in such amounts that the end product resulting from the admixture of the first pre-mixture (I) with the subsequently described second pre-mixture (II) is solid at room temperature (20° C.);

the said additive components being selected from:

($b_1$) at least one liquid resin component being liquid at room temperature (about 20° C.) and being hardenable under the same conditions as the above-mentioned solid resin component defined under (a), supra, as well as being capable of forming thermosetting resin therewith;

($b_2$) at least one flexibilizing component which enhances the ductility and impact strength of a completely hardened product obtainable by heating from the above-mentioned end product;

($b_3$) at least one adhesion-promoting component;

($b_4$) at least one plasticizing component;

in which mixing zone the components of the first pre-mixture are melted down by heating to the above-mentioned heating temperature range, and intimately mixed with each other;

(B) preparing a second pre-mixture (II) in the manner described hereinbefore as defined under (B), supra, from (1) at least one hardening agent as defined under (i), supra;

(2) a hardening catalyst, and (3) at least one of the following pulverulent filler components:

($3_1$) thixotropic agent for imparting thixotropy to the final product;

($3_2$) conductivity agent which imparts electrical conductivity to the final product;

($3_3$) filler additive free from imparting thixotropy or electrical conductivity to the final product; and then applying Steps (C) and (D) as described hereinbefore.

The sojourn time of the melt in the extruding zone should not exceed 5 minutes and preferably amount to 2 to 3 minutes.

The solid resin component preferably consists of at least one epoxy resin; this can be solid bisphenol-based diglycidyl ether, in particular such ether based on bisphenol A or brominated bisphenol A or bisphenol F, or it can be a glycidylized novolak, e.g. a higher (preferably tri- to octa) -functional phenol novolak or cresol novolak.

The melt constituting the first pre-mixture (I) and preferably containing an above-defined solid epoxy resin component is preferably capable of being poured at a temperature below the hardening temperature, amounting preferably to 100° to 200° C., and its viscosity is preferably in the medium range, in particular in the range of about 5,000 to 50,000 m.Pa.sec and preferably from about 15,000 to 20,000 mPa.sec. Optionally, the first pre-mixture (I) behaves as a Newtonian fluid.

The melt representing the first pre-mixture (I) is introduced into the extruding zone preferably as a thin curtain which extends preferably transverse to the direction of conveying the melt through the extruding zone.

The second pre-mixture (II) should preferably be in a fluidized state when fed into the extruding zone, and it is preferred that neither the first pre-mixture (I) nor the second pre-mixture (II) is reactive by itself at room temperature. The temperature of the mass passing through the extruding zone is advantageously held at 60° to 80° C. and preferably about 70° C., and the extrusion is preferably carried out continuously. The final product preferably represents a highly reactive system of resin and hardener and is at the same time preferably highly viscous. It preferably possesses a tacky surface.

The racking of the final product discharged from the extruder into barrels is carried out by introducing the product through the bottom end of a barrel or the like container filling the latter from its lower end upward and thereby avoiding the occlusion of air in the interior of the final product filling the barrel as well as avoiding a local build-up of heat in the filled-in mass of the final product.

The extrusion products which are obtained as final products of the process according to the invention are multi-component systems, solid at room temperature (20° C.) in which the resin component and the hardening agent are present simultaneously. The hardening of the mixture which is solid at room temperature (20° C.) and is heat-hardenable and meltable, and represents the final product of the process according to the invention can be initiated by heating the mixture up to or above its hardening temperature and can be completed by keeping the mixture at such temperature during a determined period of time.

There are suitable for use as resin components in the process according to the invention especially the epoxy resin compounds described in Ullmann, supra, on page 236. Particularly suitable are the heat-hardenable epoxy systems which are described in U.S. Pat. No. 3,641,195 and also in the European patent application Publication No. 0150674 on page 2 and 6 to 8 thereof.

Examples of such epoxy resin compounds are:

(α) solid polyglycidyl and poly-(β-methylglycidyl) esters, for instance those obtained by the reaction of an aromatic polycarboxylic acid with epichlorohydrin, glycerol dichlorohydrin or β-methylepichlorohydrin in the presence of a base. Suitable aromatic polycarboxylic acids are aromatic dicarboxylic acids such as phthalic, isophthalic or terephthalic acid, or aromatic tri- or tetracarboxylic acids such as trimellitic acid, trimesic acid, pyromellitic acid and benzophenone-tetracarboxylic acid.

(β) solid polyglycidyl and poly-(β-methylglycidyl) ethers which are obtained, for instance, by the reaction of a compound containing at least two phenolic hydroxyl groups per molecule with epichlorohydrin, glycerol dichlorohydrin or β-methylepichlorohydrin in an alkaline medium or in the presence of an acid catalyst and subsequent treatment with an alkaline agent. Such solid polyglycidyl ethers are derivatives, for example, of polynuclear polyphenols, in particular bis-(hydroxyphenyl)-methane (bisphenol F), 2,2-bis-(4-hydroxyphenyl) propane (bis-phenol A), brominated 2,2-bis-(4-hydroxyphenyl)-propane, bis-(4-hydroxyphenyl) ether, bis-(4-hydroxyphenyl) sulfone, 1,1,2,2-tetrakis-( 4-hydroxyphenyl)-ethane or novolaks which are obtained by the condensation of aldehydes, preferably formaldehyde, acetal-dehyde, chloral or furfuraldehyde with phenol or with alkyl- or halogen-substituted phenols, in particular the above-described bisphenols, 2-methylphenol, 4-methylphenol, 4-tert. butylphenol, p-nonylphenol or 4-chlorophenol. As such polyglycidyl compounds, there can also be used solid polyglycidyl ethers which are obtained in a preliminary advancement reaction of bisphenols with liquid polyglycidyl ethers in a manner known per se.

(γ) solid poly-(N-glycidyl) compounds, in particular triglycidyl isocyanurate or N,N'-diglycidyl derivatives of cycloalkylene ureas, e.g., ethylene urea or 1,3-propylene urea.

Particularly preferred are solid diglycidyl ethers on a bisphenol base, e.g., in particular bisphenol A or brominated bisphenol A or bisphenol F, as well as glycidylized novolaks, in particular glycidylized novolaks based on phenol and formaldehyde or based on cresol and formaldehyde.

These solid resins can also be used in the preparation of the first pre-mixture (I) in combination with liquid epoxy resins, for example with liquid diglycidyl ethers based on a bisphenol.

As flexibilizers there can be used those compounds known to the art-skilled in the field of epoxy resins, in particular the plasticizers conventionally used in the working of thermosetting resins such as, for example, acrylonitrile-butadiene copolymers, acrylonitrile, polyesters and polyethers. These compounds largely satisfy the technical demands made on the final products of the process according to the invention, while they effect the hardening process only in a negligible degree ("Die Kunststoffe und ihre Eigenschaften" by Hans Domininghaus, 2nd ed., VDI Verlag, D-4000 Düsseldorf, pages 760/761, Römpps Chemie Lexikon, 7th ed. "Weichmacher" pages 3893–3896).

On pages 642 and 643 of the text-book "Die Kunststoffe ..." just mentioned above, adhesion promoters are described generally and preferred silane compounds usable as such adhesion promoters in the process according to the invention are also described therein.

Preferred plasticizers are phthalate and adipate softeners, for instance, benzylbutyl phthalate. As reactive thinners there can be used phenyl or cresylglycidyl ethers, butanedioldiglycidyl ethers or hexahydrophthalic acid diglycidyl ether.

Hardening agents which are heat-activatable, but inactive at room temperature (20° C.) have been described in the above-mentioned text book "Die Kunststoffe..." in the passage from the fifth-last line on page 757 to line 13 on page 760. Further details about hardening agents in the process according to the invention are given in the European patent application No. 0150674, mentioned hereinbefore, in lines 4 to 19 on page 9 as far as the hardening agents mentioned therein are activated preferably at 80° C. and higher, and preferably not above 200° C., while they are solid and inactive at room temperature (20° C.) and up to 30° C.

All latent hardening agents and accelerators known in resin hardening techniques can be used as hardening agents in the process according to the invention in so far as they are pulverulent and are sufficiently inactive at room temperature. Preferred examples of such hardeners are dicyandiamide, aromatic primary polyamines such as 4,4'-diaminodiphenylmethane or 4,4'-diaminodiphenylsulfone, and solid polycarboxylic anhydrides such as phthalic anhydride, pyromellitic dianhydride, benzophenonetetracarboxylic dianhydride or trimellitic anhydride.

As hardening accelerators or catalysts there can be used the compounds described in the afore-mentioned European patent application No. 0150674, from line 20 on page 9 to line 13 on page 10 thereof. Further suitable urea-based hardening accelerators are N-(2-hydroxyphenyl)-N',N'-dimethylurea and 2,4-bis-(N,N-dimethylureido)-toluene, furthermore imidazoles, in particular 2-methylimidazole, 1-benzyl-2-methylimidazole and 1-cyanoethyl-2-methylimidazole, the salts of tertiary amines with carboxylic acids or phenols as well as adducts of the tertiary amines with epoxy resins and salts of such adducts.

Finally, there can be further introduced into the second pre-mixture (II) prepared in the process according to the invention, such additives which are fillers serving as mere extenders, or reinforcing agents, agents for imparting electrical conductivity, or a desired fluidity or thixotropy, respectively.

Thus, as fillers there may be introduced into the second pre-mixture (II) textile fibers, glass fibers, asbestos fibers, boron fibers, carbon fibers, calcium carbonate such as limestone, dolomite, mineral silicates such as kaolin, talcum, wollastonite, mica and other alumosilicates, quartz powder, pyrogeneous or precipitated silicic acids and silicon dioxide or silica aerogel, alumina hydrate, bentonite, as well as metal powders such as aluminum powder or iron powder, furthermore pigments and colorants such as color soots, oxide colors, titanium dioxide, zinc sulfide or baryte. In order to increase the viscosity of transparent heat-hardenable final products of the process according to the invention, there may be used, e.g. the above-mentioned alumina hydrate or basic zinc carbonate.

Thixotropy is a desired property of the heat-hardenable final products produced by the process according to the invention especially during further mechanical working of the same, for instance when they are to be applied as coatings in thick layers on steeply inclined or vertical surfaces. Thixotropic agents which can be used in the second pre-mixture (II) comprise above all fibrous fillers and preferably pyrogeneously surface-treated, e.g. silanized silica. Electrical conductivity is imparted to the final products of the process according to the invention by the admixture of metal powders and the like.

The examples given hereinbefore of the different kinds of additives are not to be considered as limitative as any substances which fulfill the conditions stipulated hereinbefore with regard to such additives, namely that these additives must be inert relative to the solid resin component defined under (a) supra when added to the first pre-mixture (I), and pulverulent when added to the second pre-mixture (II) will be suitable.

Of course, when a temperature above the hardening temperature is used to convert the first pre-mixture to a melt, such temperature must not be so high as to decompose any constituent of the pre-mixture. Moreover, the melt must be cooled down sufficiently below the hardening temperature, before the melt comes into contact with the hardener-containing second pre-mixture in the extruding zone, and preferably while being introduced, e.g., as a poured curtain, into that zone.

The above-described process according to a first invention aspect can be carried out, according to the second aspect of the invention, in a plant which comprises (a) a container to be charged with a mixture of solid and liquid components, to be melted down therein, and equipped with a stirrer and a temperature control for adjusting the temperature therein and keeping it in a determined temperature range;

(b) a first dosing scales unit for weighing melts, being connected to the container for receiving molten material therefrom;

(c) a mixing unit for mixing solid pulverulent components therein with formation of a substantially homogeneous pulverulent mixture;

(d) a second dosing scales unit for weighing powder mixtures, being connected to the said mixing unit for receiving pulverulent mixtures therefrom;

(e) an extruder, preferable a twin-screw extruder equipped with an air-tight inlet chamber, and connecting means for connecting the inlet chamber to the first dosing scales unit, and further equipped with an inlet for pulverulent mixtures and an outlet for extruded final products; and (f) air exclusion means for preventing the penetration of air into the melt on the latter's travel from the said container to, and into the mass conveyed through, the extruder; which means preferably comprise vacuum pump means for evacuating at least the said inlet chamber and free spaces occurring in the interior of the extruder.

Preferably, the plant according to the invention further comprises (g) a delivery-and-confectioning unit for extruded final product, which unit can be connected to the extruder outlet, on the one hand, and to barrels or the like recipients, on the other hand, in a manner such that, during the filling of the final product into the recipients, the penetration of air into the mass of final product therein is practically prevented.

The above-mentioned inlet chamber is provided with airtight walls, with a through passage for melted product at the lower end of the chamber and opening into the interior of the extruder connected to the chamber and provided with a screw-assembly having at least one screw axis extending parallel with the direction of conveying material through the extruder, with an inlet tube for melted product which tube extends through a chamber wall into the interior of the chamber, the open tube end in the said interior being equipped with a discharge nozzle, and with connecting means provided in a chamber wall for connecting vacuum pump means thereto.

Preferably the discharge nozzle has a wide elongated slot which extends transverse to the direction of conveyance through the extruder, i.e., the axes of the screw means, optimally at a right angle thereto.

BRIEF DESCRIPTION OF THE DRAWINGS

Further objects, detailed features and advantages of the plant for carrying out the above-described process according to the invention in practice will appear from the following detailed description of a preferred embodiment thereof in connection with the accompanying drawings in which.

DETAILED DESCRIPTION OF THE EMBODIMENT SHOWN IN THE DRAWINGS

Figure 1:
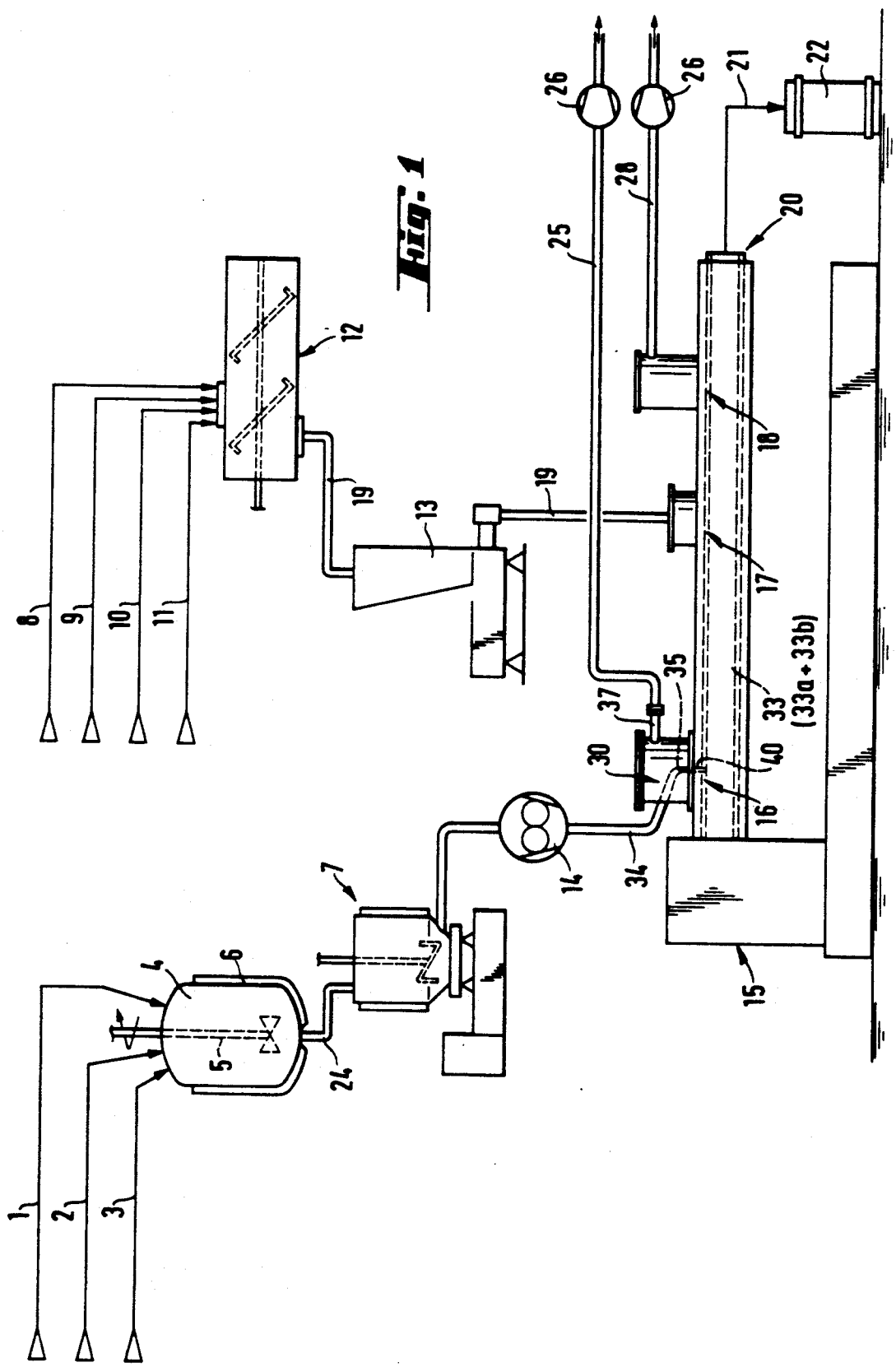
FIG. 1 shows the above-mentioned preferred embodiment of the plant, in schematical representation.

The plant according to the invention illustrated in FIG. 1 comprises a first production branch shown in the left half of FIG. 1, which serves for preparing the first pre-mixture (I) and a second branch, shown in the right half of FIG. 1, for preparing the second pre-mixture (II). The first production branch comprises a stirrer-equipped vessel or agitator 4 which is provided with feeding lines 1 for solid resin, 2 for liquid resin and 3 for at least one solid meltable or for a liquid additive. Of course, there can be provided a further feeding line for a second additive, and so forth. When, for instance, the additive introduced through the feeding line 3 is liquid then, a further solid additive can be fed into the agitator 4 by way of an additional feeding line (not shown). Other additives can be introduced in a corresponding manner.

The agitator 4 is equipped with a stirrer 5 and with a heating device 6 which is so dimensioned that the temperature of the interior of the vessel 4 can be raised to about 90° to 110° C. and be kept at that melting temperature until a melt of satisfactory fluidity is present in the vessel.

Furthermore, the vessel 4 is provided with a conventional degassing device. From the vessel 4, a melt of good flowability passes by way of a heatable gas-tightly enclosed conveying line 24 into the dosing unit 7 of the first process branch, which is preferably a differential dosing scale, and from there through a heatable, gas-tightly enclosed conveying line 34, which can be equipped, if necessary, with a gear pump serving as melt-conveying device 14, into an extruder 15 to be described more in detail further below.

In the other production branch there is provided a powder mixing apparatus 12, e.g., a simple plow-share mixer, into which a feeding line 8 introduces the solid room temperature-inactive hardening agent, a feeding line 9 the hardening accelerator, a feeding line 10 thixotropic agent or another solid additive, and a feeding line 11 filler. Downstream of the powder mixer 12, the latter is connected to a second dosing scale unit 13 which is supplied with the pulverulent mixture from the mixing unit 12 by way of a pipe line 19.

Both production branches lead into the common extruder 15. The latter is advantageously a twin-screw extruder having, upstream in the direction of conveyance through the extruder, a first intake zone 16 and subsequent to the latter a second intake zone 17 located in a middle region of the conveying path for the material through the extruder, i.e., the extrusion reach in the latter.

Moreover, the extruder comprises a degassing zone 18 and an outlet end 20. The geometry of the screw or screws is preferably chosen in a manner such that, when applying a vacuum in the extruder interior via a suction line, connected preferably in the degassing zone 18, with the aid of one of the vacuum pumps 26, the extruder interior will be successfully sealed off against the outside by the cord portion of the final product, of the inventive process, present in the extruder outlet end 20.

Figure 2:
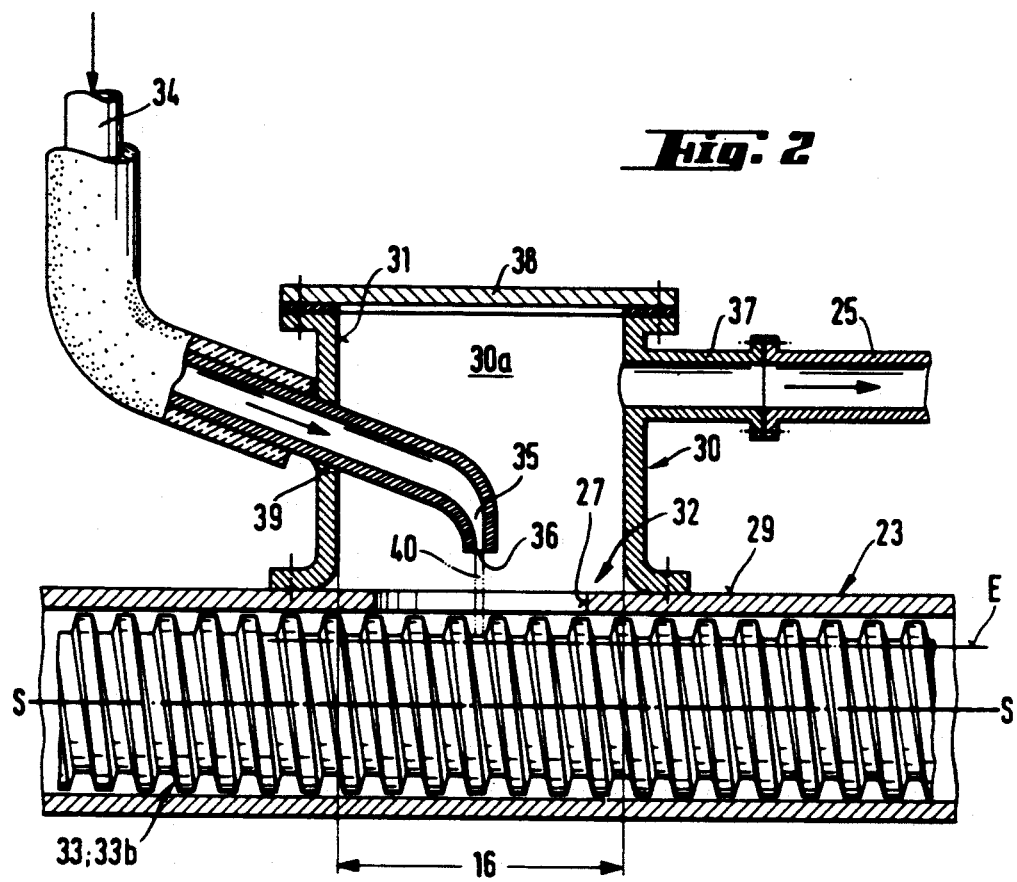
FIG. 2 shows a longitudinal sectional view of a preferred embodiment of the extruder inlet chamber.
Figure 3:
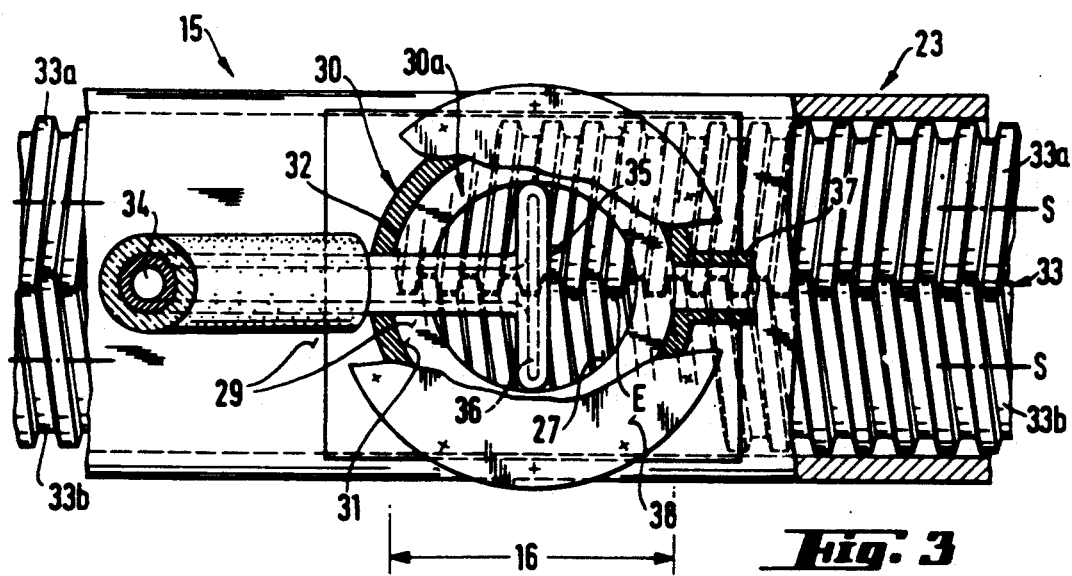
FIG. 3 shows the same embodiment of the inlet chamber as FIG. 2 but in a partially cut-open top view.

In the first intake zone 16, located upstream in the extruder, there is mounted gas-tightly on the extruder upper side 29, an inlet chamber 30 the construction of which shall be described more in detail below with reference to FIGS. 2 and 3. The interior 30a of the inlet chamber 30 is gastight relative to the upper wall 29 of the extruder housing 23 above the first intake zone 16 of the extruder. The walls of the chamber 30 comprise sidewalls 31 and a top end wall which is preferably devised as, or provided with, a lid 38. The lid 38 is gas-tightly seated in the top end wall or on the upper rims of the chamber side walls 31 and screwed down in position, e.g., with an interposed sealing gasket. At its lower end 32, the chamber 30 is open or devised as a through passage which opens downwardly into an inlet opening 27 which is provided in the upper wall 29 of the extruder housing 23 in the first intake zone 16 and registers with the said through-passage. In one of the chamber sidewalls 31 there is provided an opening 39 in which there is mounted gas-tight the conveying line 34 for the melt or the like fluidized mass, which is designed as an inlet tube bearing at its end a wide slot nozzle 35. The nozzle outlet is formed by an elongated slot 36 which extends preferably transverse to the direction of conveyance through the extruder 15, i.e. with it longitudinal slot axis crossing the longitudinal screw means S of the twin-screw 33 at a preferably right angle.

The length of the nozzle slot in a practical embodiment of the discharge nozzle 35 is preferably about 30 to 70 mm and optimally about 40 mm, while the width of the slot 36 amounts correspondingly to about 1 to 5 mm and preferably about 2 to 3 mm. From the elongated slot 36 the melt emerges in the shape of a thin poured curtain 40 which drops through the passage at the lower end 32 of the chamber 30 and through the inlet opening 27, registering with the aforesaid passage, in the upper wall 29 of the extruder housing onto the twin-screws 33 and is drawn in being engaged by both twin-screws 33a and 33b rotating in equal sense, whose peripheral profiles engage each other. The height of the drop of the poured curtain 40 from the slot 36 to the intake plane between the two screws amounts preferably to 25 to 35 mm and optimally to at most 40 mm. Depending on the dimensions of the nozzle 35 given above, the poured curtain 40 will in this case have a breadth of about 30 to 60 mm and preferably from 40 to 50 mm; the thickness of the curtain will, in this case, be 0.5 to 4 and optimally from 1 to 2 mm. The desired height of curtain drop which can be determined taking into account the properties of the curtain material can be adjusted by corresponding adjusting devices (not shown) in a manner known per se to a desired level above the intake plane in the interior of the extruder. Besides such a level adjusting device, e.g., in the chamber sidewall 31 at the opening 39 for the melt-conveying line 34, there can also be provided in one of the chamber sidewalls 31 a socket 37 for the connection of a suction line 25 of one of the vacuum pumps 26.

Instead of the above-described discharge nozzle 35 with preferably transverse elongated slot 36, other curtain-forming means such as an overflow vessel (not shown) having a weir-like overflow edge can be arranged inside the inlet chamber 30 to receive the melt from the inlet tube end of the melt-conveying line 34 and release the same in the form of a curtain dropping downward from the weir-edge through the inlet opening 27 into the extruder 15. The inlet tube end may also be replaced by a inclined chute or channel ending in a transverse edge from which the curtain of molten premixture flow downward. This weir-type edge may also be replaced by a transverse row of perforations extending across the chute or channel bottom near the lower end thereof in the chamber interior 30a. A row of threads or strings of droplets will fall downward from these perforations to form a particulate curtain, thereby achieving the greatest possible ratio of surface to volume of the molten material forming the curtain, and consequently the highest degree of removing gas occluded in the melt from the curtain.

Melts of higher viscosity can also be dispensed from a sieve nozzle or wide-slot nozzle as described, with application of a slight excess pressure.

Several parallel rows of curtain forming weir-edges, elongated nozzles or rows of perforations can also be arranged at the discharge end of the melt-conveying line 34 inside the inlet chamber 30, whereby several thin coherent or particulate curtains will drop downward parallel with each other through the inlet opening 27 into the extruder 15. This will ensure practically complete degassing, but will also permit discharge of a larger amount of melt, at a higher rate, from the conveying tube 34, as the larger amount of melt will be split up and distributed over a number of correspondingly thinner parallel curtains.

A mode of carrying out the inventive process in practice will now be explained with the aid of a number of working examples (all temperatures are given in ° C.), proceeding as follows:

Preparation of a Melt Master Batch (Pre-Mixture I)

Liquid resin components and liquid additive components are first charged into the agitator 4 at about 90° to 100°. The solid components, above all solid resin and, as the case may be, solid meltable additives are then added with continuous stirring. The molten mixture is then homogenized at 90° to 110° and at the same time degassed at a reduced pressure of 40 mbar.

Preparation of the Powder Mixture (Pre-Mixture II)

Solid pulverulent components, above all the hardening agent, fillers and optionally thixotropizing agent are mixed in a plow-share mixer 12 at room temperature (20° C.).

Production of the Heat-Hardenable End Product of the Process

The master batch being in the molten state at 60° to 70° is dosed with the aid of the differential dosing scales 7 and the gear pump 14 via the conveying line 34 into the inlet chamber 30 which has been evacuated down to a pressure of 30 mbar absolute, and drops as a poured curtain 40 out of the elongated slot nozzle 35 through the inlet opening 27 into the first intake zone 16 of the extruder 15 in which the master batch is seized by the two screws 33a and 33b and is conveyed in the direction toward the extruder outlet 20.

The pulverulent mixture constituting the pre-mixture (II) is introduced with dosing by means of the second differential dosing scales 13 into the second intake zone 17, located downstream of the first intake zone 16 (inlet chamber 30) in the direction of conveyance, in the extruder 15. The degassing zone which extends in the extruder downstream from the second intake zone 17 to the outlet 20 is evacuated to an absolute pressure of 20 to 30 mbar, and the two pre-mixtures are intimately mixed with each other in this zone.

The discharge of the extruded product from the ejection head (outlet 20) without pressure increase at a temperature of 55° to 70° is carried out in a conventional manner into a dip pipe which is flange-connected with the outlet 20, and is part of the delivery-and-confectioning unit 21 and opens into a barrel or the like recipient 22 through the bottom end of the latter so that the penetration of air into the interior of the mass of end product inside the barrel is avoided.

The pulverulent mixture constituting the pre-mixture (II) can also be divided into two half-portions of which the first half-portion is introduced into the aforesaid second intake zone 17, while the second half-portion is introduced into a third intake zone (not shown) of the extruder 15 which third intake zone is located between the second intake zone 17 and the extruder outlet (ejection head) 20. While the temperature of the melt can be about 110° to 120° in the first intake zone 16 of the extruder 15, the temperature of the plastified mass in the second zone of the extruder is below the hardening temperature, for instance still at 90° to 110°. When a third intake zone is present in the extruder, the temperature of the mass in this zone will still be at about 70° to 90°, and the mass which is discharged from the ejection head will be at about 55° to 70°.

When the second pre-mixture (II) is prepared by mixing hardening agent and additives among which there is at least one liquid component, then a mixer with planet stirrer will have to be used instead of the plowshare mixer and there would be obtained a paste and not a pulverulent mixture. When the preparation of the first pre-mixture (I) comprises the presence of non-melting additives such as fillers, then these would result in temperatures of 130° to 140° in the first, 110° to 120° in the second, and 90° to 100° in a third intake zone of the extruder, which would severely restrict the choice of hardening agents being still inactive at these temperatures, and would easily lead to an undesirable, at least partial pre-hardening of the extruded end product.

Heat-hardenable solid end products of the process according to the invention are, for instance, obtained from the components listed below in accordance with the mode of operation described in the foregoing:

EXAMPLE 1

Pre-mixture I from:

50 parts by weight solid bisphenol A-diglycidyl ether resin having an epoxide content of 1.6 equivalents per kilogram (kg)

15 parts by weight of an adduct from carboxyl-terminated acrylonitrile/butadiene-copolymer having an acrylonitrile content of 26 weight-% and an acid number of 32 mg KOH/g, and a liquid bisphenol A-diglycidyl ether resin having an epoxide content of 5.3 equivalents per kg, in a weight ratio of 7:8, (as flexibilizer).

Pre-mixture II from:
4 parts by weight dicyandiamide, as hardener
28 parts by weight ground chalk, as filler
3 parts by weight pyrogenous silica as thixotropic agent.

EXAMPLE 2

Pre-mixture I from:

| | |
|---|---|
| 50 parts by weight solid bisphenol | A-diglycidyl ether resin having an epoxide content of 1.6 equivalents per kg |
| 10 parts by weight liquid bisphenol | A-diglycidyl ether resin having an epoxide content of 5.3 equivalents per kg |
| 10 parts by weight of the flexibilizer | used in Example 1. |

Pre-mixture II from:
4 parts by weight dicyandiamide
22 parts by weight ground chalk
4 parts by weight pyrogenous silica.

EXAMPLE 3

Pre-mixture I:
the same as in Example 2.
Pre-mixture II from:
4 parts by weight dicyandiamide
20 parts by weight ground chalk
4 parts by weight pyrogenous silica
2 parts by weight p-chlorophenyldimethyl urea.

EXAMPLE 4

Pre-mixture I:
the same as in Example 2.
Pre-mixture II from:
4 parts by weight dicyandiamide
22 parts by weight ground chalk
2 parts by weight pyrogenous silica
2 parts by weight electrically conductive soot (Ruβ Corek L)

EXAMPLE 5

Pre-mixture I from:

| | |
|---|---|
| 40 parts by weight solid bisphenol | A-diglycidyl ether resin having an epoxide content of 1.6 equivalents per kg |
| 14 parts by weight liquid bisphenol | A-diglycidyl ether resin having an epoxide content of 5.3 equivalents per kg |
| 10 parts by weight of the flexibilizer | used in Example 1. |

Pre-mixture II from:
10 parts by weight isophthalic dihydrazide
22 parts by weight ground chalk
4 parts by weight pyrogenous silica.

EXAMPLE 6

Pre-mixture I from:

| | |
|---|---|
| 45 parts by weight solid bisphenol | A-diglycidyl ether resin having an epoxide content of 2.6 equivalents per kg |
| 10 parts by weight liquid bisphenol | F-diglycidyl ether resin having an epoxide content of 5.9 equivalents per kg |

15 parts by weight of a flexibilizer consisting of the adduct of linear neopentylglycol sebacate polyester having terminal carboxyl groups (equivalent weight 700) and bisphenol A-diglycidyl ether in a molar ratio of 1:2.

Pre-mixture II
the same as in Example 5.

EXAMPLE 7

Pre-mixture I from:

| | |
|---|---|
| 55 parts by weight solid bisphenol | A-diglycidyl ether resin having an epoxide content of 1.1 equivalents per kg |
| 10 parts by weight liquid bisphenol | A-diglycidyl ether resin having an epoxide content of 5.3 equivalents per kg |
| 5 parts by weight of a flexibilizer | consisting of epoxidized polypropylene glycol having a molar weight of 1000 and an epoxide content of 1.8 equivalents per kg. |

Pre-mixture II:
the same as in Example 5.

Similar pre-mixtures I are obtained by replacing in the above examples the solid bisphenol A-based resin component by an equivalent component of

EXAMPLE 8:

| | |
|---|---|
| solid brominated bisphenol | A-diglycidyl ether resin having an epoxy content of 4.5 equivalents per kg and a bromine content of about 20% by weight. |

EXAMPLE 9:

| | |
|---|---|
| solid bisphenol | F-diglycidyl ether having an epoxide content of about 4.3 to 4.5 equivalents per kg. |

EXAMPLE 10:

a solid octaglycidylized phenol novolak having an epoxy content of 5.7 equivalents per kg and a softening range of about 120°–130° C.

EXAMPLE 11:

a solid tetraglycidylized cresol novolak having an epoxy content of about 4.1 equivalents per kg and a softening point of 99° C.

In comparison with hitherto known processes, the process according to the invention offers a number of important advantages. Thus, the preparation of the two pre-mixtures I and II only requires an agitator or the like stirrer-equipped container for the preparation of the first pre-mixture I being liquid at elevated temperature, and a drum mixer for the preparation of the pulverulent, second pre-mixture II, as well as for each of the two mixtures, a separate dosing scales for introducing doses of the respective pre-mixture into the common extruder. Each of the two mixtures is not by itself reactive and can therefore be stored for an unlimited time. Inherent risks are therefore reduced to a minimum in carrying out the process according to the invention in practice.

The hot liquid pre-mixture I possesses a smaller viscosity, than is the case when the hitherto known pasty pre-mixtures are provided, and it shows an approximately Newtonian behavior of flow. This permits the extrusion to be carried out at a lower temperature. Moreover, the first pre-mixture I being liquid at elevated temperature can be handled and dosed without problems.

In the preparation of the first pre-mixture I the solid resin component (a) can also possess a melting point above the hardening temperature, with the proviso that cooling down of the first pre-mixture to somewhat below the melting temperature of the mixture, as it will occur anyhow on its way to the extruder, must never lead to a segregation of components or a partial solidification of the melt. The process according to the invention permits the production of heat-hardenable resin/hardener formulations, above all such formulations having a tacky surface, such as in particular reactive hot melt adhesives which are both highly reactive and of high viscosity, and can be fully hardened by heating, with formation of thermosetting resins.

We claim:

1. A process for manufacturing a thermosetting resinous composition being solid and storable at room temperature, remeltable and having a definitive curing temperature comprising (A) preparing a liquid, individually non-reactive first pre-mixture (I) by directly introducing into a heatable mixing zone
  (a) a resin component which is solid at about 20° C. and meltable without decomposition at a melting temperature extending from slightly below to above said curing temperature, and
  (b) at least one additive component being inert relative to said solid resin component (a);
melting the component (a) by heating the mixing zone to about the melting temperature and intimately mixing the same with the component (b), the weight proportions of the two components being such that, at the melting temperature of said component (a), the viscosity of the mixture is in the range of from about 5,000 to 100,000 mPa.sec;

(B) preparing a pulverulent or pasty, individually non-reactive second pre-mixture (II) by directly intimately mixing
  (i) a solid pulverulent curing agent capable of curing all resin components present in said first pre-mixture and being inactive at 20° C. and heat-activatable, as well as at least one of the following pulverulent additive components;
  (ii) at least one curing accelerator; and
  (iii) at least one filler;

(C) continuously introducing the melt, constituting said first pre-mixture, as obtained from said mixing zone, into an extruding zone of an extruder while avoiding occlusions of air therein, and then conveying said melt toward an exit end of said extruder zone;

(D) continuously introducing into said extruding zone, for mixing with said first pre-mixture (I) at a temperature below said curing temperature but at least about 60° C., said pulverulent or pasty second pre-mixture in such proportion that the content of said second pre-mixture in the end product discharge from said exit end of said extruding zone amounts to at least 10 to maximally 50 percent by weight of the total weight of said thermosetting resinous composition, said intimate mixing in said extruding zone producing from said individually non-reactive first and second pre-mixtures said thermosetting resinous composition being solid, storable at room temperature, remeltable and curable by heat activation; and (E) discharging said thermosetting resinous composition from said exit end of said extruding zone into a storage vessel, where upon cooling to room temperature said thermosetting resinous composition solidifies and remains storable until it is remelted for further use.

2. A process as defined in claim 1, wherein at least one of said additive components defined under (b) is liquid at 20° C. and any additional solid additive component thereof is meltable in the melting temperature range defined under (a), while any component being liquid at 20° C. must be added only in such amount that the end product resulting from the admixture of said first pre-mixture with said second pre-mixture after extrusion is solid at 20° C.;

the said additive components being selected from the group consisting of ($b_1$) at least one liquid resin component being liquid at 20° C. and being curable under the same conditions as said solid resin component defined under (a);

($b_2$) at least one flexibilizing component augmenting the ductility and impact strength of a completely curable product obtainable by heating from said end product;

($b_3$) at least one adhesion-promoting component; and ($b_4$) at least one plasticizing component; and wherein filler designated under (iii) is at least one pulverulent component selected from the group consisting of ($3_1$) thixotropic agent imparting thixotropy to the resulting end product;

($3_2$) conductivity agent imparting electrical conductivity to said end product; and ($3_3$) filler additive free from imparting either thixotropy or electrical conductivity to said end product.

3. A process as defined in claim 1, wherein the sojourn time of said melt in said extruding zone is at most 5 and at least 2 minutes.

4. A process as defined in claim 1, wherein said solid resin component defined under (a) is an epoxy resin component.

5. A process as defined in claim 4, wherein said epoxy resin component is a solid bisphenol-based diglycidyl ether.

6. A process as defined in claim 5, wherein said diglycidyl ether is bisphenol A-based.

7. A process as defined in claim 5, wherein said diglycidyl ether is brominated bisphenol A-based.

8. A process as defined in claim 4, wherein said diglycidyl ether is bisphenol F-based.

9. A process as defined in claim 4, wherein said epoxy resin component is a glycidylized novolak.

10. A process as defined in claim 9, wherein said novolak is a phenol-novolak.

11. A process as defined in claim 9, wherein said novolak is a cresol novolak.

12. A process as defined in claim 1, wherein said curing temperature is about 100° to 200° C.

13. A process as defined in claim 1, wherein said first pre-mixture (I) is introduced into the extruding zone at a temperature below the curing temperature.

14. A process as defined in claim 13, wherein said first pre-mixture has a viscosity at dosing temperature of from about 5,000 to 50,000 mPa.sec.

15. A process as defined in claim 14, wherein the viscosity of said first pre-mixture at dosing temperature is about 15,000 to 20,000 mPa.sec.

16. A process as defined in claim 1, wherein said first pre-mixture has Newtonian flow behavior.

17. A process as defined in claim 1, wherein neither of said first pre-mixture (I) and second pre-mixture (II) is reactive by itself at 20° C.

18. A process as defined in claim 1, wherein said first pre-mixture is introduced into said extruding zone in the form of a curtain having a thickness of 1-5 mm.

19. A process as defined in claim 18, wherein the length of said curtain is measured horizontally along an axis extending transverse to the direction of conveyance of material through said extruding zone and is 30-70 mm.

20. A process as defined in claim 1, wherein said second pre-mixture is in a free-flowing pulverulent state.

21. A process as defined in claim 1, wherein the temperatures of said first and said second pre-mixtures being conveyed through the conveying zone toward the exit thereof are kept at about 70° C.

22. A process as defined in claim 1, wherein the temperature of said first and said second pre-mixtures being conveyed through the conveying zone toward the exit thereof are kept at about 70° C.

23. A process as defined in claim 1, wherein the conveyance of said first and second pre-mixtures through said extruding zone toward an exit end thereof is carried out continuously.

24. A process as defined in claim 1, wherein said thermosetting resinous composition has a tacky surface.

25. A process as defined in claim 24, wherein said thermosetting resinous composition after solidifying is a reactive hot melt adhesive.

26. A process as defined in claim 1, wherein the content of said second pre-mixture (II) in said thermosetting resinous composition amounts to about 20 to 35% by weight of the total weight.

* * * * *